May 13, 1952
L. G. HOPPES
2,596,898
DEVICE FOR THE MIXING AND DISPENSING OF
A PLURALITY OF MATERIALS
Filed Jan. 27, 1948
3 Sheets-Sheet 1
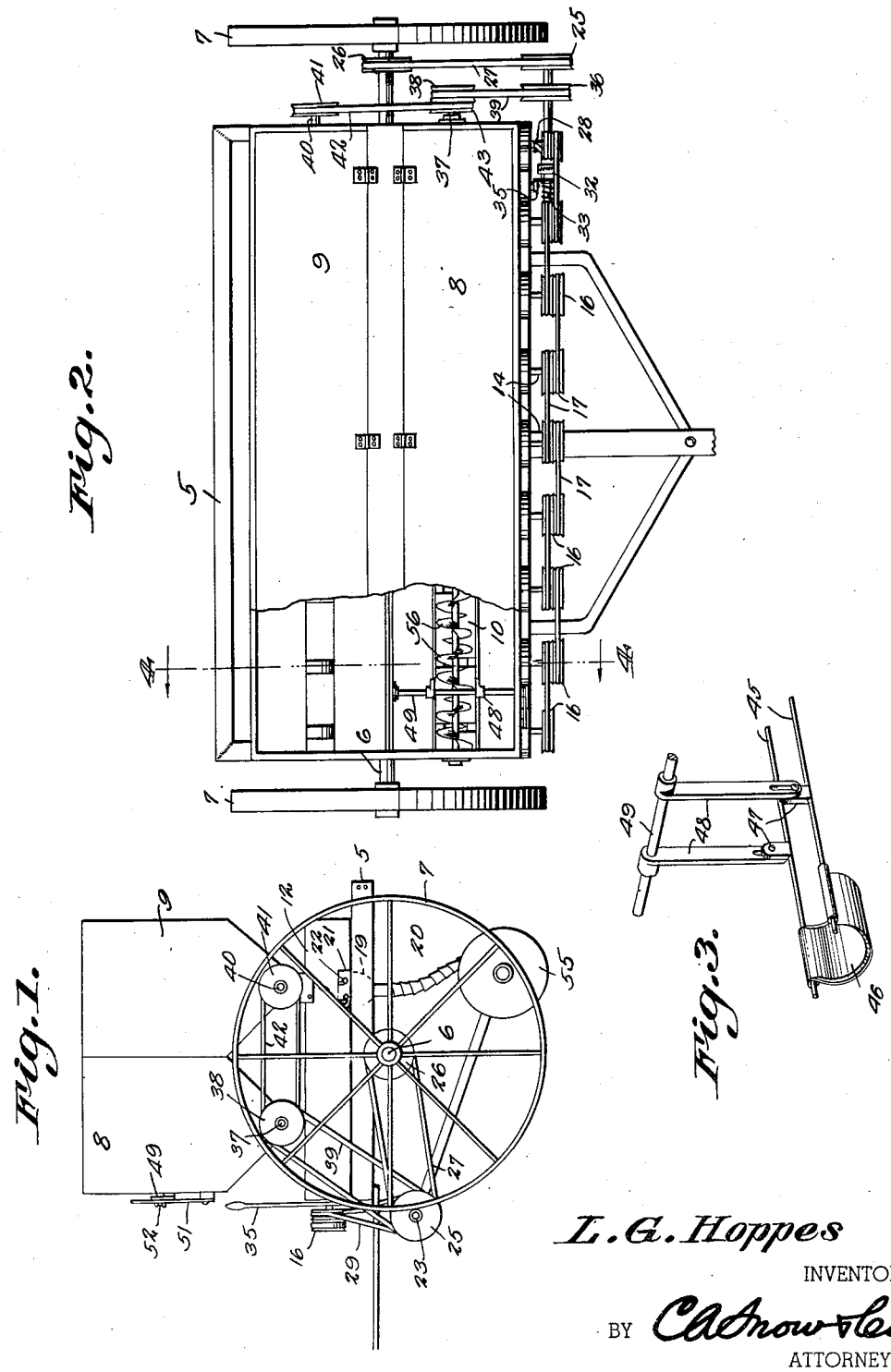
L. G. Hoppes
INVENTOR
BY *CA Snow &Co.*
ATTORNEYS.

May 13, 1952  L. G. HOPPES  2,596,898
DEVICE FOR THE MIXING AND DISPENSING OF
A PLURALITY OF MATERIALS
Filed Jan. 27, 1948  3 Sheets-Sheet 2
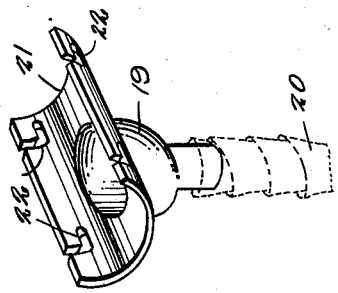
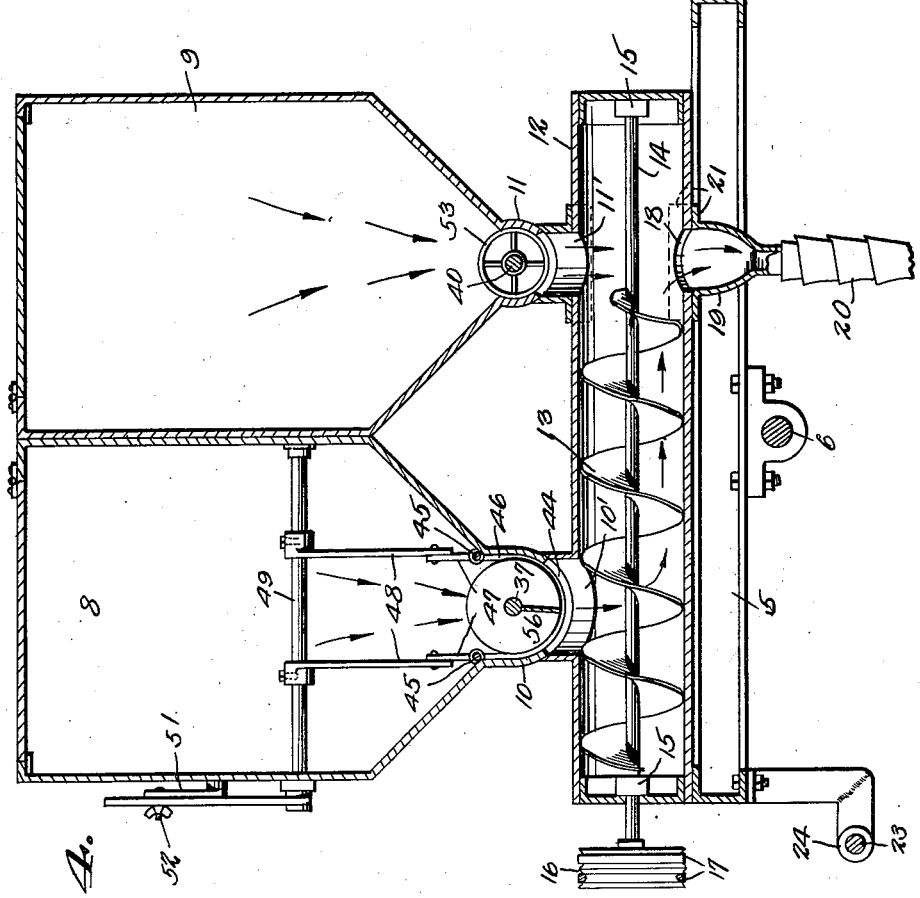
L.G.Hoppes
INVENTOR May 13, 1952   L. G. HOPPES   2,596,898
DEVICE FOR THE MIXING AND DISPENSING OF
A PLURALITY OF MATERIALS
Filed Jan. 27, 1948   3 Sheets-Sheet 3
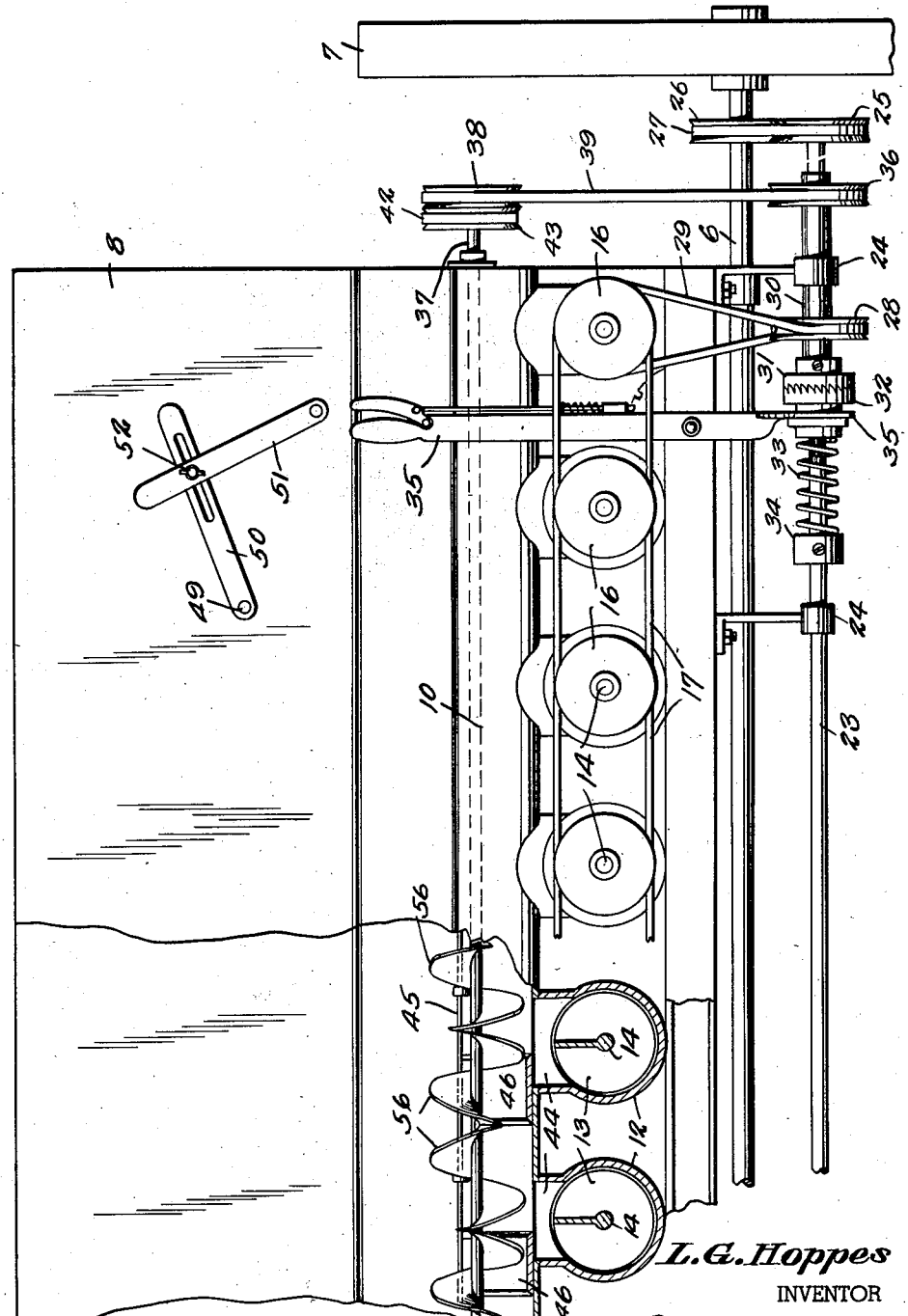
L.G.Hoppes
INVENTOR
BY  C.A.Snow&Co.
ATTORNEYS.

Patented May 13, 1952

2,596,898

UNITED STATES PATENT OFFICE 2,596,898

DEVICE FOR THE MIXING AND DISPENSING OF A PLURALITY OF MATERIALS

Lloyd G. Hoppes, Hazelton, Kans., assignor to Insul-Wool Machinery Manufacturing Co., Wichita, Kans., a corporation of Kansas Application January 27, 1948, Serial No. 4,601

1 Claim. (Cl. 222—142)

This invention relates to agricultural machines, and more particularly to seed planters, wherein a quantity of fertilizing material is deposited or planted with the seed.

An important object of the invention is to provide means for accurately spreading the seed and fertilizer, in planting in rows, to the end that the proper amount of fertilizer will be deposited with a predetermined quantity of seed, for the best results.

Still another object of the invention is to provide means whereby the fertilizing material, which is usually in the nature of a finely ground material, will not clog the discharge opening of the hopper in which the fertilizing material is held, but will be gradually fed from the hopper with the seed.

Still another object of the invention is to provide means whereby the discharge of the seed and fertilizing material may be discontinued while the machine is being moved from place to place, or from one field to another.

Still another object of the invention is to provide means for regulating the quantity of fertilizing material to be delivered with the seed, thereby adapting the machine for use in planting seeds of various kinds and which require a variation in the amount of fertilizing material deposited with the grain.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 1 is an end elevational view of a planting machine, constructed in accordance with the invention.

Figure 2 is a plan view thereof, a portion of the covers of the seed hopper and fertilizer hopper, having been removed to illustrate the interior structure of the planter.

Figure 3 is a perspective view of one of the sliding closures used in regulating the quantity of fertilizing material deposited with the seed being planted.

Figure 4 is a sectional view taken on line 4—4 of Figure 2.

Figure 5 is a perspective view of one of the removable grain and fertilizer distributing spouts.

Figure 6 is an enlarged fragmental elevational view of the front of the machine, a portion of the rear wall of the fertilizer hopper having been broken away, illustrating the feed screws of the hopper.

Referring to the drawings in detail, the reference character 5 indicates the frame of the planter to which the axle 6 is secured, and on which the wheels 7 are mounted to cause rotation of the axle 6, as the wheels 7 rotate.

Mounted on the frame, are the hoppers 8 and 9 which are of lengths to extend throughout the width of the frame 5, the hoppers 8 and 9 being arranged adjacent to each other with their feed troughs 10 and 11 and their discharge spouts 10' and 11' respectively communicating with the distributing tubes 12 supported on the frame 5, directly under the hoppers.

The hoppers 8 and 9 are provided with a plurality of discharge spouts arranged longitudinally thereof, in spaced relation with respect to each other, the spouts discharging fertilizer and grain, into the various distributing tubes.

Mounted within the distributing tubes 12 are feed worms 13 mounted on the shafts 14 that operate in bearings 15 disposed in the ends of the distributing tubes.

On one end of each shaft 14, are pulleys 16 which pulleys are connected by means of the V-belts 17, so that rotary movement of one pulley, will be transmitted to the remaining pulleys to operate the shafts 14 and feed worms secured thereto.

Formed in the bottom of the distributing tubes 12, and disposed adjacent to the forward ends thereof, are discharge openings 18 that establish communication between the removable spouts 19, and the flexible distributing spouts 20, the spouts 19 having curved plates 21 formed integral therewith, the curved plates being designed to fit the curvatures of the distributing tubes 12. These plates are formed with bayonet slots 22 that are adapted to fit over securing pins extending from the distributing tubes, so that the distributing spouts 19, will be securely held in position. The discharge openings 18 are in vertical alignment with the respective discharge spout from the grain feed trough whereby the grain drops from the spouts and into the discharge openings. The feed worms 13 extend rearwardly from the front ends of the distributing tubes 12 and terminate at the discharge openings 18 for delivering fertilizer thereto. The fertilizer mingles with the dropping grain and passes therewith through the discharge openings.

The reference character 23 indicates a shaft which is mounted in bearings 24 that depend from the frame of the machine, the shaft 23 receiving its motion through the pulley 25 and pulley 26, the pulleys being connected by means of the belt 27.

Also secured on the shaft 23, is the pulley 28 that transmits movement to the pulley 16 at one end of the frame, through the belt 29. The pulley 28 is secured to the sleeve 30 that is loosely mounted on the shaft 23, the sleeve 30 having the clutch member 31 formed at one end thereof. Cooperating with the clutch member 31, is the clutch member 32, which is splined on the shaft 23 and normally forced toward the clutch member 31, by means of the coiled spring 33, the spring also engaging the collar 34 which is secured to the shaft 23.

The reference character 35 indicates the operating lever, which is secured to the clutch member 32, whereby the clutch 32 may be moved into and out of engagement with the clutch member 31, to throw the pulley 28 into and out of operation.

The sleeve 30 is of a length to extend through the adjacent bearing 24 and provide a support for the pulley 36 so that when the pulley 28 is set in motion, the pulley 36 will also be set in motion. The reference character 37 indicates the shaft that extends throughout the length of the fertilizer hopper 8 on which shaft 37 is mounted a pulley 38 that receives the motion from the pulley 36, through the belt 39. Operating within the seed hopper 9, is a shaft 40, on which the pulley 41 is secured, over which pulley 41 operates the belt 42 that in turn operates over the pulley 43 secured to the shaft 37.

As clearly shown by Figure 4 of the drawings, the spout 10 is provided with discharge openings 44 that establish communication between the fertilizer hopper and the distributing tubes 12. Mounted within the fertilizer hopper adjacent to the discharge spouts 10, are spaced rods 45 on which the closures 46 are secured, the closures 46 being curved to conform to the curvature of the discharge spouts 10, so that they may be moved to close the discharge spouts or close a portion of the discharge spouts, regulating the quantity of fertilizer passing therethrough.

It will, of course, be understood that there is a closure such as indicated at 46, disposed adjacent to each discharge opening.

Extending upwardly from the rods 45 are ears 47 to which the arms 48 are pivotally connected, the arms 48 being secured to the shaft 49 that extends through the fertilizer hopper 8. Mounted on one end of the shaft 49, is the lever 50 which lever may be operated to rotate the shaft 49 and swing the arms 48 to move the rods 45 and closures 46, within the fertilizer hopper, to regulate the size of the discharge openings 44 of the discharge spouts 10. A locking lever 51 is provided adjacent to the operating lever 50, which lever 51 is provided with a set screw 52 to secure the locking lever 51 and lever 50 together, holding the shaft 49 in its positions of adjustment to insure the desired quantity of fertilizer being fed from the hopper 8.

Arranged within the hopper 9, and disposed adjacent to the delivery spout thereof, is an agitator 53 mounted on the shaft 40 that extends throughout the length of the hopper. As clearly shown by the drawings, the flexible distributing spouts 20 deliver fertilizer and seed directly to the drill discs 55 so that the seed and fertilizer will be covered during the planting operation.

From the foregoing, it will be seen that due to the construction shown and described, I have provided distributing tubes disposed directly under the hoppers of the planter, to thoroughly mix the fertilizer and seed, for the proper planting.

As shown by the drawings, the worm sections 56 mounted in the hoppers and distributing tubes, may be moved into and out of operation to the end that when the machine is being moved from one field to another, the planting mechanism may remain idle and be thrown into operation by means of the lever 35 for planting.

It will further be seen that the worm sections or spirals 56 are arranged in opposite directions so that as the shaft 37 rotates, the worm sections or spirals will operate to feed material to the discharge openings 44, thereby evenly distributing the fertilizer throughout the discharge spouts.

Owing to the arrangement of the worm sections on the shaft 37, substantially V-shaped scoops with inclined sides are provided at the contacting ends of the worm sections, directly over the discharge openings, which scoops pick up the material and deliver the material to the discharge openings at the same time maintaining the material within the hopper well agitated.

Having thus described the invention, what is claimed is:

A planter comprising a wheel supported frame, elongated fertilizer hopper and grain hopper mounted on the frame in juxtaposition, feed troughs extending longitudinally of and forming part of the hoppers, spaced discharge spouts depending from the troughs and communicating therewith, a plurality of spaced distributing tubes mounted under the hoppers and extending transversely of the feed troughs, each discharge spout depending from the feed trough of the fertilizer hopper communicating with a distributing tube adjacent the front end thereof, each discharge spout depending from the feed trough of the grain hopper communicating with a distributing tube adjacent the rear end thereof, said tubes having discharge openings in vertical alignment with the respective discharge spout from the feed hopper for dropping grain into said discharge openings through which the grain and fertilizer pass for planting, feed worms operating in the fertilizer hopper troughs for delivery of fertilizer into the respective discharge spouts for gravity flow into the distributing tube, agitators operating in the grain hopper troughs for effecting flow of grain into the distributing tubes, and conveying worms operating within the distributing tubes and extending rearwardly from the front ends of said tubes and terminating at the discharge openings of the tubes for delivering fertilizer thereto for mixture with the grain dropping from the respective discharge spout of the feed hopper whereby the fertilizer and grain to be planted pass together through the discharge openings.

LLOYD G. HOPPES.

REFERENCES CITED

The following references are of record in the file of this patent:

UNITED STATES PATENTS

| Number | Name | Date |
|---|---|---|
| 721,733 | Nance | Mar. 3, 1903 |
| 818,396 | Torres | Apr. 17, 1906 |
| 2,085,263 | Lauterbur | June 29, 1937 |
| 2,161,701 | Dimick | June 6, 1939 |